United States Patent
Reddy et al.

(10) Patent No.: US 12,081,533 B2
(45) Date of Patent: Sep. 3, 2024

(54) SYSTEM AND METHOD FOR CONVERTING RTMP STREAM INTO HLS FORMAT FOR LIVESTREAM

(71) Applicant: Jio Platforms Limited, Ahmedabad (IN)

(72) Inventors: Tatikonda Yashwanth Reddy, Telangana (IN); Bhisham Pratap Singh, Telangana (IN); Gaurav Duggal, Telangana (IN); Sameer Mehta, Maharashtra (IN); Manoj Kumar Garg, Madhya Pradesh (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 336 days.

(21) Appl. No.: 17/710,332

(22) Filed: Mar. 31, 2022

(65) Prior Publication Data
US 2022/0321549 A1    Oct. 6, 2022

(30) Foreign Application Priority Data
Mar. 31, 2021   (IN) ............................. 202121014784

(51) Int. Cl.
| | |
|---|---|
| *H04L 9/40* | (2022.01) |
| *H04L 65/60* | (2022.01) |
| *H04L 65/65* | (2022.01) |
| *H04L 67/02* | (2022.01) |
| *H04L 67/148* | (2022.01) |
| *H04L 67/2866* | (2022.01) |
| *H04L 67/565* | (2022.01) |
| *H04L 67/568* | (2022.01) |

(52) U.S. Cl.
CPC .............. *H04L 63/08* (2013.01); *H04L 65/60* (2013.01); *H04L 65/65* (2022.05); *H04L 67/02* (2013.01); *H04L 67/148* (2013.01); *H04L 67/2866* (2013.01); *H04L 67/565* (2022.05); *H04L 67/568* (2022.05)

(58) Field of Classification Search
CPC ......... H04L 63/08; H04L 65/60; H04L 65/65; H04L 67/02; H04L 67/148; H04L 67/565; H04L 67/568; H04L 63/0428; H04L 65/61; H04L 65/70
See application file for complete search history.

(56) References Cited

U.S. PATENT DOCUMENTS

| | | | |
|---|---|---|---|
| 2014/0281007 A1* | 9/2014 | Lemmons | H04L 65/762 709/231 |
| 2022/0150514 A1* | 5/2022 | Miller | H04N 19/436 |

* cited by examiner

*Primary Examiner* — Izunna Okeke
(74) *Attorney, Agent, or Firm* — FINNEGAN, HENDERSON, FARABOW, GARRETT & DUNNER, LLP

(57) ABSTRACT

Present disclosure relates to system and method for converting RTMP stream into HLS format for live stream. The solution architecture can include three main components: a Publisher, a Streamer and an API server. The publisher manages incoming RTMP streams and converts RTMP stream into multiple (resolutions) HLS streams with an adaptive bit rate. The streamer manages end users consuming HLS feed. As publisher can be busy doing transcoding, the streamer can serve HLS format to an end user. At streamer level, caching is done instead of sending all requests to publisher. The API server manages load on the publishers and the streamers, and makes sure that the servers are available all the time. Live stream API server keeps record of the streams which are available as well as the corresponding publishers having the streams.

16 Claims, 9 Drawing Sheets

```
1  #EXTM3U
2  #EXT-X-VERSION:3
3  #EXT-X-STREAM-INF:PROGRAM-ID=1,CLOSED-CAPTIONS=NONE,BANDWIDTH=2628000
4  ch-2070f7633-0dba-4510-885f-f7f7b550816f-src/index.m3u8
5  #EXT-X-STREAM-INF:PROGRAM-ID=1,CLOSED-CAPTIONS=NONE,BANDWIDTH=1128000,RESOLUTION=853x480
6  ch-2070f7633-0dba-4510-885f-f7f7b550816f-480p1128kbs/index.m3u8
7  #EXT-X-STREAM-INF:PROGRAM-ID=1,CLOSED-CAPTIONS=NONE,BANDWIDTH=878000,RESOLUTION=640x360
8  ch-2070f7633-0dba-4510-885f-f7f7b550816f-360p878kbs/index.m3u8
9  #EXT-X-STREAM-INF:PROGRAM-ID=1,CLOSED-CAPTIONS=NONE,BANDWIDTH=528000,RESOLUTION=426x240
10 ch-2070f7633-0dba-4510-885f-f7f7b550816f-240p528kbs/index.m3u8
```

FIG. 6A

```
1  #EXTM3U
2  #EXT-X-VERSION:3
3  #EXT-X-MEDIA-SEQUENCE:3
4  #EXT-X-TARGETDURATION:4
5  #EXT-X-KEY:METHOD=AES-128,URI="1600316029695.key",IV=0x000000000000000017677280C09F
6  #EXTINF:4.400,
7  1600316033992.ts
8  #EXT-X-KEY:METHOD=AES-128,URI="1600316038341.key",IV=0x000000000000000017677280E065
9  #EXTINF:4.000,
10 1600316038341.ts
11 #EXT-X-KEY:METHOD=AES-128,URI="1600316042322.key",IV=0x0000000000000000176772807BC
12 #EXTINF:4.000,
13 1600316042322.ts
14 #EXT-X-KEY:METHOD=AES-128,URI="1600316046364.key",IV=0x00000000000000001767728...
15 #EXTINF:4.467,
16 1600316046364.ts
```

FIG. 6B

SYSTEM AND METHOD FOR CONVERTING RTMP STREAM INTO HLS FORMAT FOR LIVESTREAM

RESERVATION OF RIGHTS

A portion of the disclosure of this patent document contains material which is subject to intellectual property rights such as, but are not limited to, copyright, design, trademark, IC layout design, and/or trade dress protection, belonging to Jio Platforms Limited (JPL) or its affiliates (herein after referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

FIELD OF INVENTION

The present disclosure relates to the field of communication systems. More particularly, the present disclosure relates to system and method for converting RTMP stream into HLS format for live stream.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

Real-Time Messaging Protocol (RTMP) was initially a proprietary protocol developed by Macromedia for streaming audio, video and data over the Internet, between a Flash player and a server. The main disadvantage of RTMP stream is its incapability to cache at edge server level, which causes difficulty in scaling things in production. The default port of RTMP stream served is 1935 and is blocked by most the firewalls.

Therefore, in order to overcome these shortcomings, RTMP stream is required to be converted to proper format live streaming.

OBJECTS OF THE PRESENT DISCLOSURE

Some of the objects of the present disclosure, which at least one embodiment herein satisfies are as listed herein below.

It is an object of the present disclosure to provide for a system and method for caching RTMP at an edge server level.

It is an object of the present disclosure to provide for a system and method to prevent blocking by firewalls.

It is an object of the present disclosure to provide for a system and method to convert RTMP stream to HLS format and server it to end user over http, whose response can be cached at edge server level.

It is an object of the present disclosure to provide for a streamer component which passes a fraction of traffic requests to Publisher and remaining traffic requests are served from cache.

It is an object of the present disclosure to provide for the streamer component can be added as and when required depending upon the traffic.

It is an object of the present disclosure to provide for a system that enables scaling of the product.

SUMMARY

This section is provided to introduce certain objects and aspects of the present invention in a simplified form that are further described below in the detailed description. This summary is not intended to identify the key features or the scope of the claimed subject matter.

In order to achieve the aforementioned objectives, the present invention provides a system and method for converting Real-Time Messaging Protocol (RTMP) into HTTP Live streaming (HLS). The system may include one or more processors coupled with a memory, wherein said memory stores instructions which when executed by the one or more processors causes the system to: receive, at a publisher module, a set of data packets, wherein the set of data packets pertain to RTMP data stream received from one or more servers. The publisher module may be operatively coupled to the processor. The system may further be configured to receive, at the publisher module, a first key along with the set of data packets, wherein the first key may be associated with a second key of a server; extract, by the publisher module, the first key from the set of data packets received; authenticate, by the publisher module, the set of data packets, wherein the first key extracted from the set of data packets may be validated against the second key associated with the server; extract, by the publisher module, one or more metadata from the authenticated set of data packets based on a set of predefined resolutions; and transcode, by the publisher module, the one or more metadata extracted into one or more HLS formatted data packets based on a predefined set of instructions.

In another aspect, the present disclosure includes a method for converting Real-Time Messaging Protocol (RTMP) into HTTP Live streaming (HLS). The method may be executed by a processor, and includes the steps of receiving, at a publisher module coupled to one or more processors, a set of data packets, wherein the set of data packets pertain to RTMP data stream received from one or more servers; and wherein the publisher module is operatively coupled to the processor; and receiving, at the publisher module, a first key along with the set of data packets, wherein the first key is associated with a second key of a server. Further, the method may include the step of extracting, by the publisher module, the first key from the set of data packets received; and the step of authenticating, by the publisher module, the set of data packets, wherein the first key extracted from the set of data packets may be validated against the second key associated with the server. Furthermore, the method may include the step of extracting, by the publisher module, one or more metadata from the authenticated set of data packets based on a set of predefined resolutions. The method may also include the step of transcoding, by the publisher module, the one or more metadata extracted into one or more HLS formatted data packets based on a predefined set of instructions.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

FIGS. 6A and 6B illustrate an exemplary representation of a master manifest file and a child manifest file, respectively, in accordance with an embodiment of the present invention.

The foregoing shall be more apparent from the following more detailed description of the invention.

BRIEF DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The present disclosure relates to the field of communication systems. More particularly, the present disclosure relates to system and method of converting RTMP stream into HLS format for live stream.

Figure 1A:
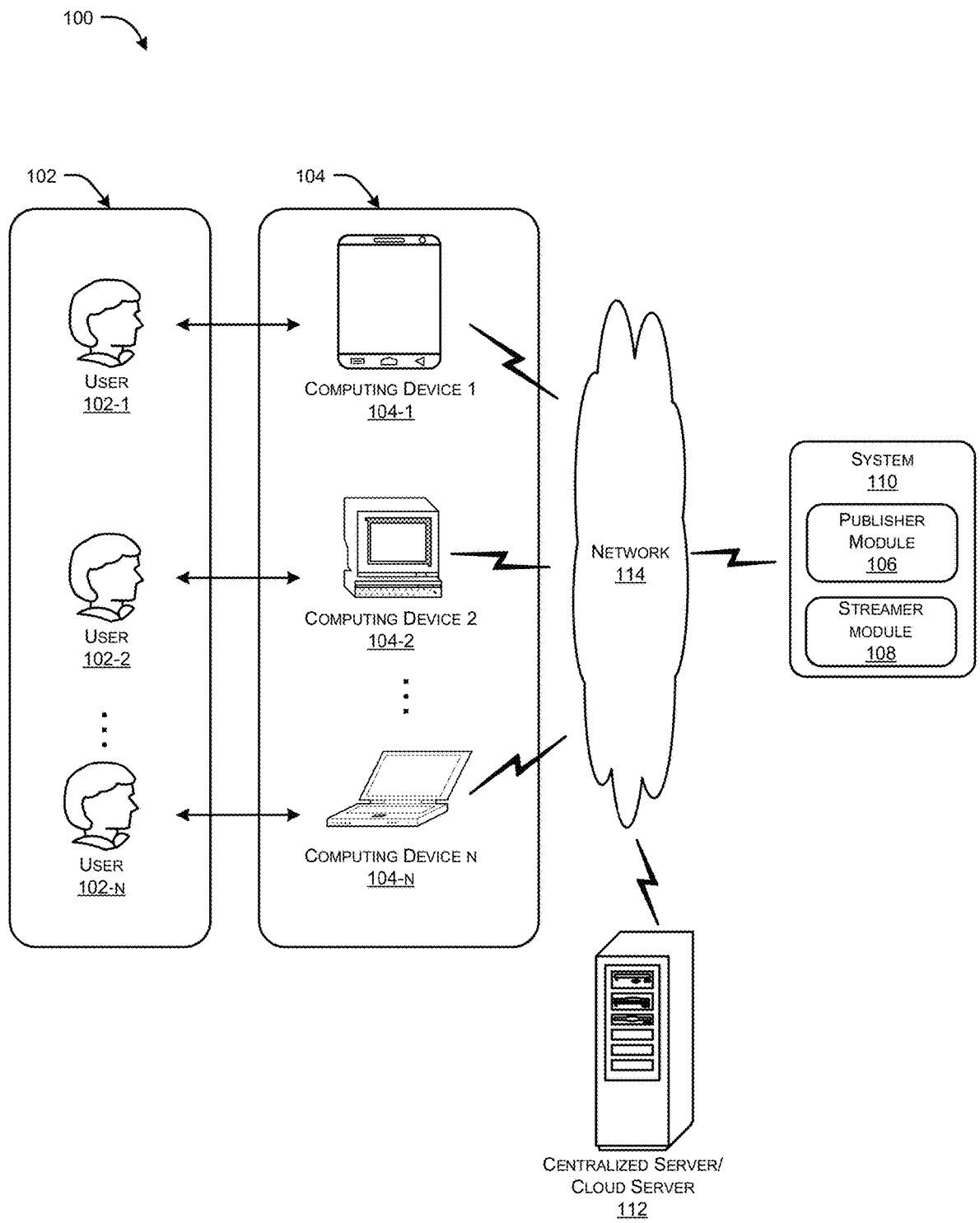
FIG. 1A illustrates an exemplary system architecture of the proposed system for converting RTMP stream into HLS format for live streaming, in accordance with an embodiment of the present invention.

Referring to FIG. 1A that illustrates an exemplary network architecture (100) in which or with which system 110 of the present disclosure can be implemented, in accordance with an embodiment of the present disclosure. As illustrated, the exemplary architecture 100 includes a system 110 equipped with a publisher module 106 (hereinafter interchangeably referred to as the publisher 106) and a streamer module 108 (hereinafter interchangeably referred to as the streamer 108) for converting Real-Time Messaging Protocol (RTMP) into HTTP Live streaming (HLS) to a plurality of users 102-1, 102-2, . . . 102-n (hereinafter collectively referred to as users 102). Each user may be associated with at least one end user computing device 104-1, 104-2, . . . 104-n (hereinafter interchangeably referred as a computing device; and collectively referred to as 104). The users 102 may interact with the system 110 by using their respective computing device 104, wherein the computing device 104 and the system 110 may communicate with each other over a network 114. The system 110 may be associated with a centralized server 112 that may be one or more servers. The publisher module 106 may be communicatively coupled to the centralized server 112 and not directly connected to the computing devices 104. The streamer module 108 may be communicatively coupled to the computing devices 104 and the centralized server 112 (also simply referred to as server 112).

The system 110 may be caused by the processor to receive, at the publisher module 106, a set of data packets pertaining to RTMP data stream received from one or more servers 112. The publisher module 106 may be operatively coupled to the processor. The system 110 may further be configured to receive, at the publisher module 106, a first key along with the set of data packets (hereinafter interchangeably referred to as RTMP stream). The first key may be associated with a second key of the server 112. The system 110 may further extract, by the publisher module 106, the first key from the set of data packets received and then authenticate, by the publisher module 106, the set of data packets. The first key extracted from the set of data packets may be validated against the second key associated with the server 112. The system may further extract, by the publisher module 106, one or more metadata from the authenticated set of data packets based on a set of predefined resolutions; and then transcode, by the publisher module 106, the one or more metadata extracted into one or more HLS formatted data packets (hereinafter interchangeably referred to as the HLS stream) based on a predefined set of instructions.

In an exemplary embodiment, the first, the second and the third key may refer to authentication keys associated with the set of data packets.

In an embodiment, the publisher module 106 may encrypt the one or more HLS formatted data packets with a third key based on the set of predefined set of instructions, wherein the third key is linked to the first key and the second key. The publisher module 106 may store the encrypted one or more HLS formatted data packets in one or more storage devices coupled to the publisher module 106.

In an embodiment, the publisher module 106 may reject a set of data packets if a first key is not validated against a second key associated with the server. In an embodiment, the publisher module 106 may not communicatively coupled to an end user computing device.

In an embodiment, the end user computing device may access the one or more encrypted HLS formatted data packets stored in the one or more storage devices through a streamer module operatively coupled to the publisher module.

In an embodiment, the one or more processors (202) further causes the system 110 to: receive, by the streamer module 108, a set of requests pertaining to accessing of the one or more HLS formatted data packets stored in the one or more storage devices and also receive an authentication key along with the set of requests. The system 110 may extract, by the streamer module 108, the authentication key from the set of requests received; and then authenticate the set requests received. The authentication key may be extracted from the set of requests is validated against the second key associated with the server. The system 110 may further check, by the streamer module 108, if the second key corresponds to the third key associated with the one or more HLS formatted data packets; and then enable, by the streamer module 108, access to the end user computing device 104 for streaming the one or more HLS formatted data packets stored in the one or more storage devices.

In an embodiment, the streamer module 108 may reject a set of requests if an authentication key is not validated against a second key associated with the server.

In an embodiment, the streamer module 108 may further be configured to: fetch the set of HLS formatted data packets from the publisher module 106; cache the set of HLS formatted data packets in the one or more storage devices; send the set of HLS formatted data packets from the one or more storage devices to the end user computing device as a response to the request of the end user computing device; and send the set of HLS formatted data packets to a new end user, when the new user requests for the same set of HLS formatted data packets. The streamer module 108 may respond directly from the one or more storage devices without fetching set the set of HLS formatted data packets from the publisher module.

In an embodiment, the streamer module 108 may be added as and when required depending upon the traffic requests received at the publisher module.

Examples of the end user computing devices 104 can include, but are not limited to, a computing device 104 associated with an entity, a smart phone, a portable computer, a laptop, a personal digital assistant, a handheld phone and the like.

Further, the network 114 can be a wireless network, a wired network, a cloud or a combination thereof that can be implemented as one of the different types of networks, such as Intranet, BLUETOOTH, MQTT Broker cloud, Local Area Network (LAN), Wide Area Network (WAN), Internet, and the like. Further, the network 114 can either be a dedicated network or a shared network. The shared network can represent an association of the different types of networks that can use variety of protocols, for example, Hypertext Transfer Protocol (HTTP), Transmission Control Protocol/Internet Protocol (TCP/IP), Wireless Application Protocol (WAP), and the like. In an exemplary embodiment, the network 114 can be an HC-05 Bluetooth module which is an easy to use Bluetooth SPP (Serial Port Protocol) module, designed for transparent wireless serial connection setup.

Furthermore, the centralized server 112 may include one of an API server, cloud servers, edge servers but not limited to the like.

Figure 1B:
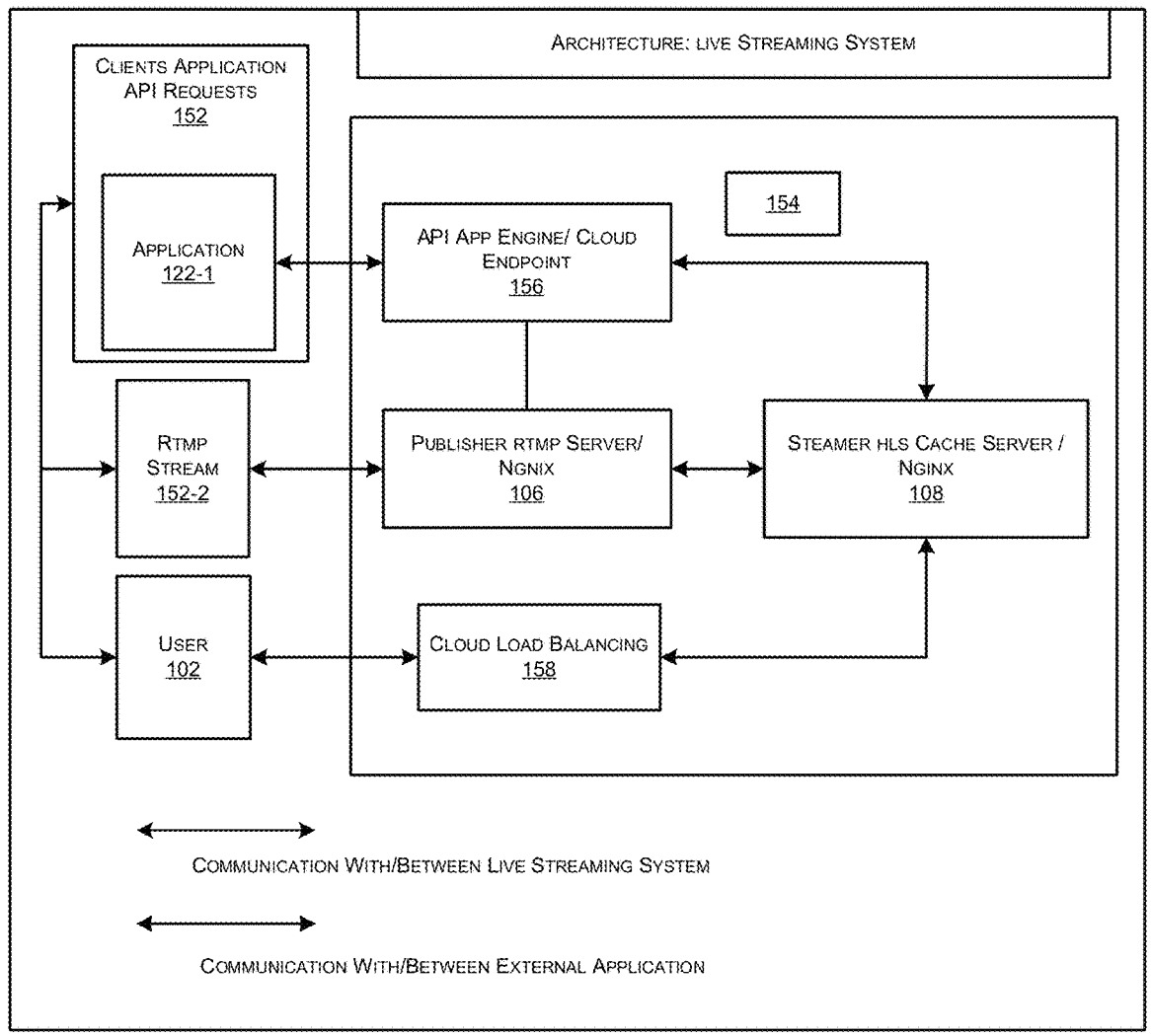
FIG. 1B illustrates an exemplary system architecture of the proposed system for converting RTMP stream into HLS format for live streaming, in accordance with an embodiment of the present invention.

FIG. 1B illustrates an exemplary system architecture for converting RTMP stream into HLS format for live streaming, in accordance with an embodiment of the present invention.

According to an aspect, the present disclosure elaborates upon a system 110 for converting RTMP stream into HLS format for live streaming. The Real-Time Messaging Protocol (RTMP) can be designed for high-performance transmission of audio, video, and data between Adobe Flash Platform technologies, including Adobe Flash Player and Adobe AIR. RTMP can be available as an open specification to create products and technology that enable the delivery of video, audio, and data in the open AMF, SWF, FLV, and F4V formats compatible with Adobe Flash Player. HTTP Live Streaming (HLS) can send audio and video over HTTP from an ordinary web server for playback on iOS-based devices, which can include iPhone, iPad, iPod touch, and Apple TV and on desktop computers (macOS), but not limited to the like. Further, using the same protocol in HLS streaming that powers the web, HLS deploys content using ordinary web servers and content delivery networks. HLS can be designed for reliability and dynamically adapting to network conditions by optimizing playback for the available speed of wired and wireless connections. HLS supports live broadcasts and pre-recorded content (video on demand, or VOD), multiple alternate streams at different bit rates, intelligent switching of streams in response to network bandwidth changes, media encryption and user authentication.

The system 110 can use at least two technologies such as RTMP and HLS for live streaming. The system 110 can provide communication between external applications 152 and live streaming system 154. The external applications 152 can include client's application API request 152-1, RTMP stream 152-2 and the users 102. The live streaming system 154 can include an Application Program Interface (API) App Engine 156, a publisher 106, a streamer 108 and a Cloud Load Balancing 158. The communication can take place with/between the components of external applications 152. Similarly, the communication can take place with/between live streaming system 154. The RTMP stream 152-2 can include a RTMP feed, which is sent to the publisher 106 where transcoding can be done to convert the RTMP feed into multiple resolutions depending upon source resolution. Thus, the publisher 106 can store either generated or converted resolutions and the publisher 106 can pass these resolutions to the streamer 108 when required. When the end user 102 requests for live stream content, firstly the requests can be directed to the streamer 108, and then the streamer 108 can search for the publisher 106 where particular live stream is being transcoded. Further, the streamer 108 can fetch the content from the publisher 106, which can cache and passes back the response to the end user 102. When another user requests for same live stream content, this time the streamer 108 can respond with cache response without fetching content again from the publisher 106, thus the load on the publisher 106 can be drastically reduced.

Figure 2A:
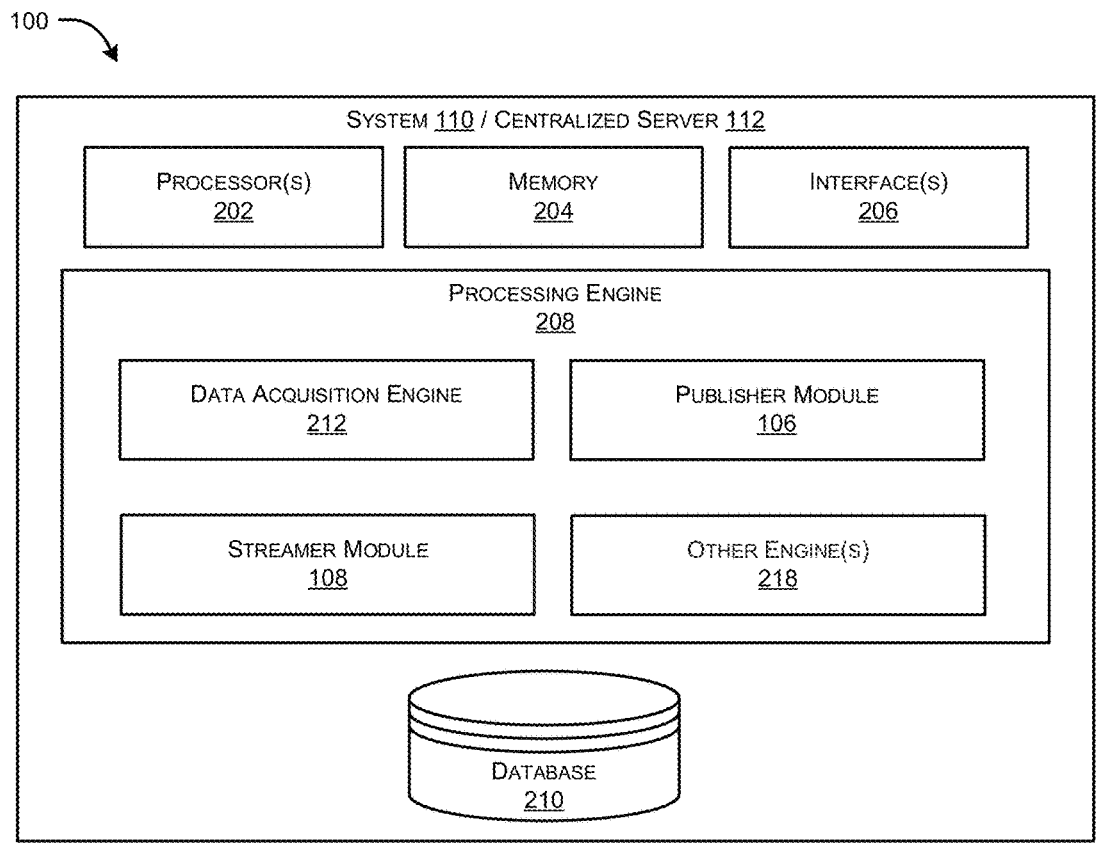
FIG. 2A illustrates an exemplary representation of proposed system/centralized server for converting RTMP stream into HLS format for live streaming, in accordance with an embodiment of the present disclosure.

FIG. 2A illustrates an exemplary representation of proposed system/centralized server for converting RTMP stream into HLS format for live streaming, in accordance with an embodiment of the present disclosure. In an aspect, the system 110/centralized server 112 may comprise one or more processor(s) 202. The one or more processor(s) 202 may be implemented as one or more microprocessors, microcomputers, microcontrollers, digital signal processors, central processing units, logic circuitries, and/or any devices that process data based on operational instructions. Among other capabilities, the one or more processor(s) 202 may be configured to fetch and execute computer-readable instructions stored in a memory 204 of the system 110. The memory 204 may be configured to store one or more computer-readable instructions or routines in a non-transitory computer readable storage medium, which may be fetched and executed to create or share data packets over a network service. The memory 204 may comprise any non-transitory storage device including, for example, volatile memory such as RAM, or non-volatile memory such as EPROM, flash memory, and the like.

In an embodiment, the system 110/centralized server 112 may include an interface(s) 206. The interface(s) 206 may comprise a variety of interfaces, for example, interfaces for data input and output devices, referred to as I/O devices, storage devices, and the like. The interface(s) 206 may facilitate communication of the system (102). The interface(s) 206 may also provide a communication pathway for one or more components of the centralized server 112. Examples of such components include, but are not limited to, processing engine(s) 208 and a database 210.

The processing engine(s) 208 may be implemented as a combination of hardware and programming (for example, programmable instructions) to implement one or more functionalities of the processing engine(s) 208. In examples described herein, such combinations of hardware and programming may be implemented in several different ways. For example, the programming for the processing engine(s) 208 may be processor executable instructions stored on a non-transitory machine-readable storage medium and the hardware for the processing engine(s) 208 may comprise a processing resource (for example, one or more processors), to execute such instructions. In the present examples, the machine-readable storage medium may store instructions that, when executed by the processing resource, implement the processing engine(s) 208. In such examples, the system 110/centralized server 112 may comprise the machine-readable storage medium storing the instructions and the processing resource to execute the instructions, or the machine-readable storage medium may be separate but accessible to the system 110/centralized server 112 and the processing resource. In other examples, the processing engine(s) 208 may be implemented by electronic circuitry. The processing engine 208 may include one or more engines selected from any of a data acquisition engine 212, the publisher module 106, the streamer module 108, and other units 218.

Figure 2B:
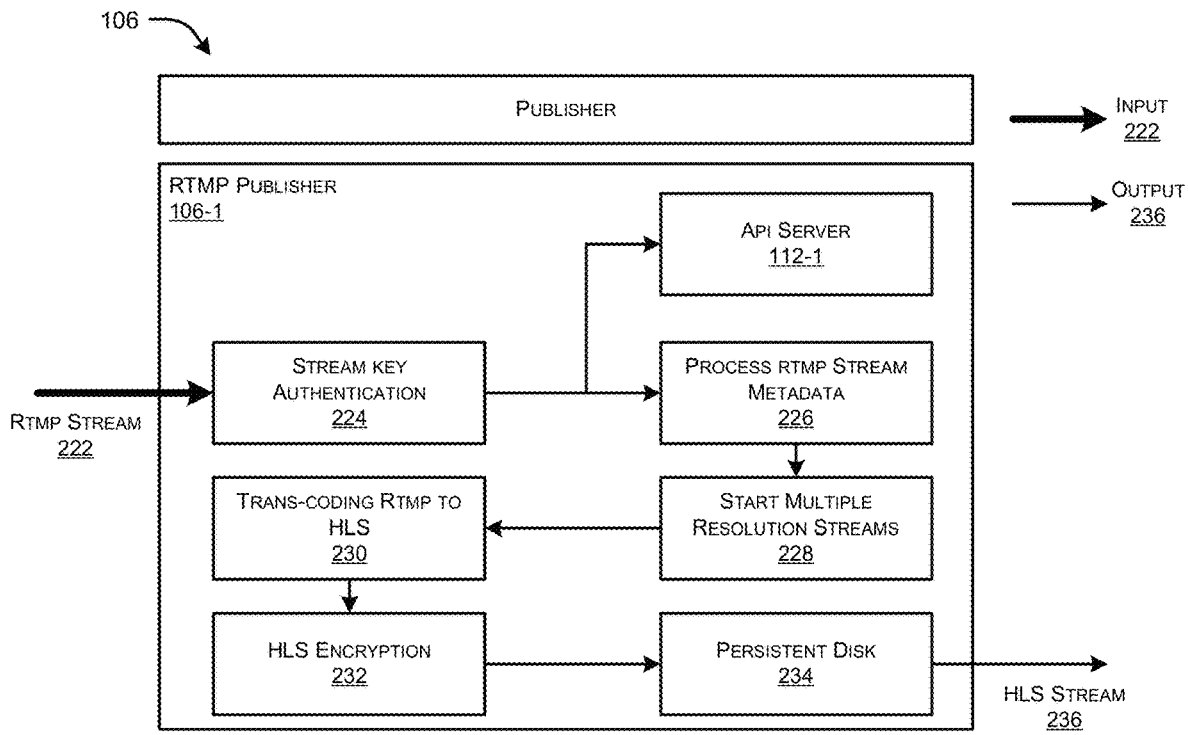
FIG. 2B illustrates an exemplary block diagram of a publisher of the proposed system, in accordance with an embodiment of the present invention.

FIG. 2B illustrates an exemplary block diagram of a publisher of the proposed system, in accordance with an embodiment of the present invention. In an embodiment, the publisher can be configured to process the incoming RTMP stream and convert the incoming RTMP into HLS format and store it in the persistent disk, which can be accessed by the streamer 108. The publisher 106 can include a RTMP publisher 106-1, API server 112-1, a RTMP stream 222, a stream key authentication unit 224, a process RTMP stream metadata unit 226, a start multiple resolution streams unit 228, a transcoding RTMP to HLS format unit 230, a HLS encryption unit 232, a persistent disk unit 234 and an HLS stream 236.

In an embodiment, the processing of an incoming RTMP stream 222 can include the steps of authentication of the RTMP stream 222 by making an API call to the API server 112-1 to verify whether a key that is passed with the RTMP stream 222 can be valid or not using the stream key authentication unit 224. If the RTMP stream 222 is not found be a valid key, then the publisher 106 can reject the incoming connection i.e RTMP stream 222. If the RTMP stream 222 is a valid key, then the metadata unit 226 of RTMP stream 222 can be processed to start the different resolution of the RTMP streams, which depends on the incoming RTMP stream 222 source resolution. Further, multiple RTMP streams unit 228 can be converted into HLS format unit 230 using the predefined set of instructions such as a third party library but not limited to it. The HLS files can be generated and encrypted using but not limited to AES 128 algorithm using the same third-party library. The generated HLS files can be stored on the persistent disk unit 234, which can be accessed by the streamer 108.

Figure 2C:
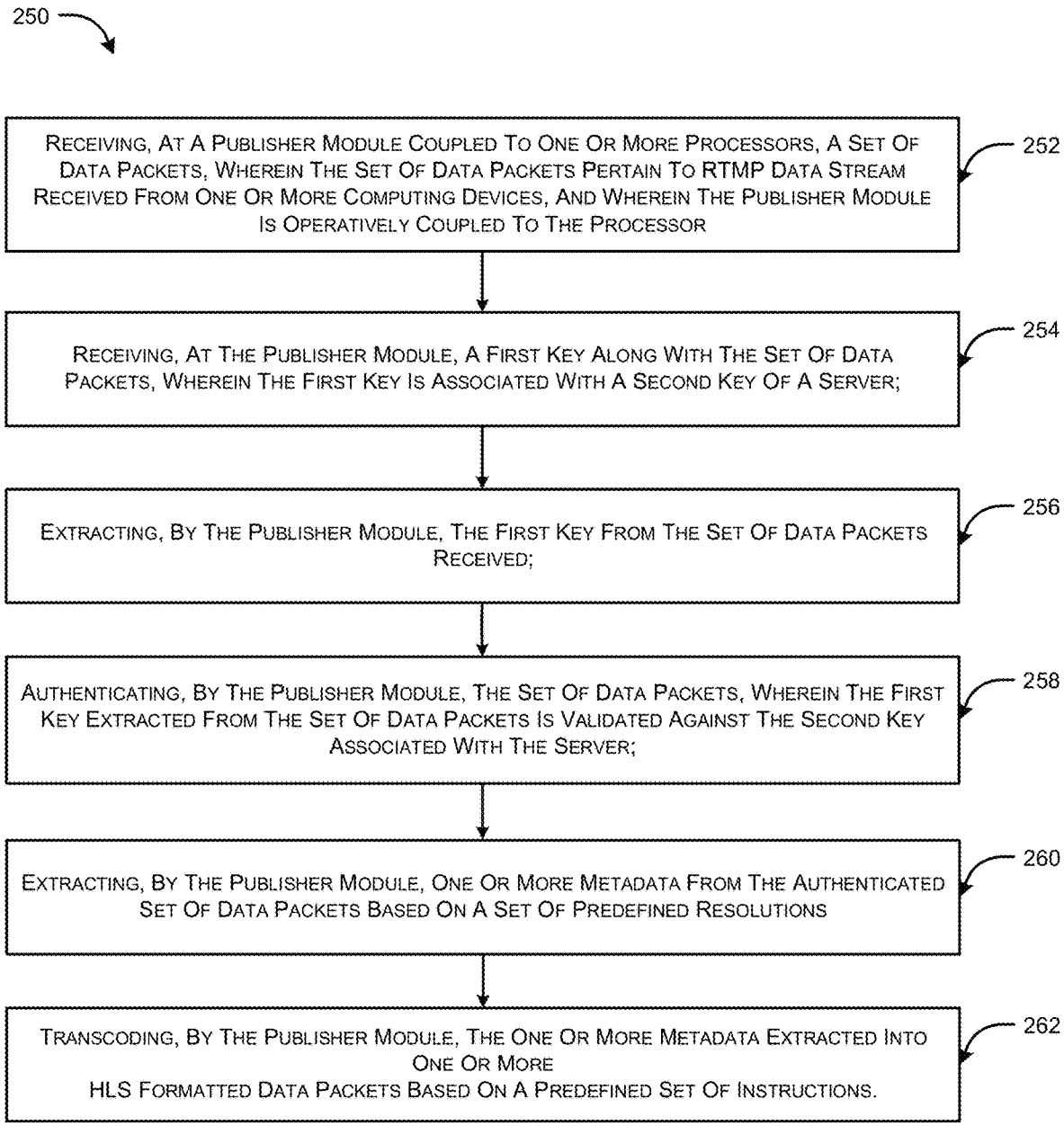
FIG. 2C illustrates an exemplary flow diagram for the proposed method, in accordance with an embodiment of the present invention.

FIG. 2C illustrates an exemplary flow diagram for the proposed method 250, in accordance with an embodiment of the present invention. In an aspect, the method 250 may be executed by a processor 202, and includes at 252 the step of: receiving, at a publisher module coupled to one or more processors, a set of data packets, wherein the set of data packets pertain to RTMP data stream received from one or more computing devices, and wherein the publisher module may be operatively coupled to the processor; and at 254, receiving, at the publisher module, a first key along with the set of data packets, wherein the first key is associated with a second key of a server.

Further, the method may include at 256, the step of extracting, by the publisher module, the first key from the set of data packets received; and at 258, the step of authenticating, by the publisher module, the set of data packets, wherein the first key extracted from the set of data packets may be validated against the second key associated with the server.

Furthermore, the method may include at 260, the step of extracting, by the publisher module, one or more metadata from the authenticated set of data packets based on a set of predefined resolutions. The method may also include at 262, the step of transcoding, by the publisher module, the one or more metadata extracted into one or more HLS formatted data packets based on a predefined set of instructions.

Figure 3:
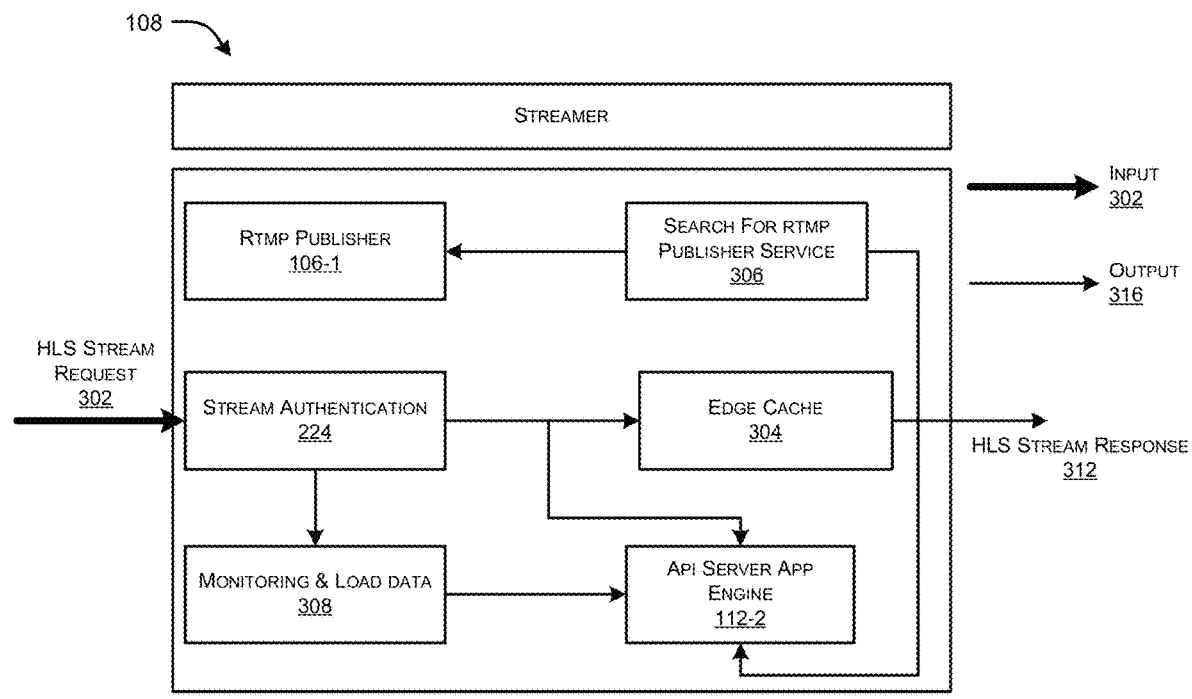
FIG. 3 illustrates an exemplary block diagram of a streamer of the proposed system, in accordance with an embodiment of the present invention.

FIG. 3 illustrates an exemplary block diagram of a streamer of the proposed system, in accordance with an embodiment of the present invention.

In an embodiment, the purpose of the streamer 108 can be passing a fraction of traffic requests to the publisher 106, and serving the remaining traffic requests from a cache. In this way, the streamer 108 can serve heavy traffic and the streamer 108 can be added when required depending upon the traffic. The streamer 108 can include a RTMP publisher 106-1, API server 112-2, a stream key authentication unit 224, an edge cache unit 304, a search for RTMP publisher service 306, a monitoring and data loading unit 308, and an HLS stream response 312.

In an embodiment, the step of processing the requests coming to the streamer 108 can include verifying request's authentication key 224 with API server 112. If authentication key 224 is not found to be a valid key, then the request can be rejected. If authentication key 224 is found to be a valid key, then the request in the edge cache unit 304 can be checked by the streamer 108. If a response for the request is found in the edge cache unit 304, the same response can be forwarded to the user. If the request cannot be found in the edge cache unit 304, then search for RTMP publisher server 306 is processed, where the request's response can be found by making a call to API server 110. Further, the request can be forwarded to particular RTMP publisher 106-1. The response from RTMP publisher 106-1 can be populated in the streamer's 108 edge cache unit 304, and the same data can be forwarded to the user.

Figure 4:
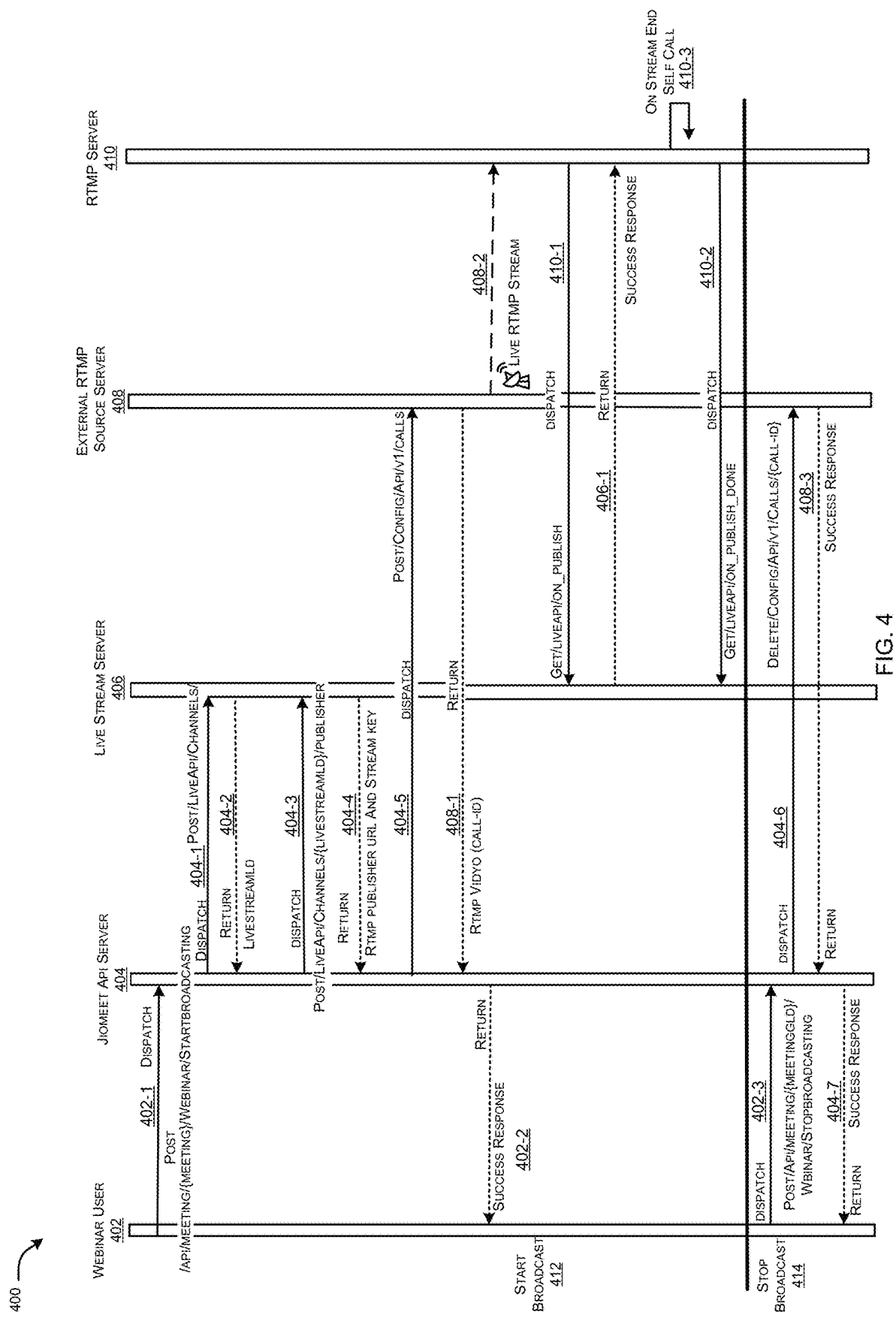
FIG. 4 illustrates an exemplary sequence diagram representing a broadcast scenario of the proposed system, in accordance with an embodiment of the present invention.

FIG. 4 illustrates an exemplary sequence diagram representing a broadcast scenario of the proposed system, in accordance with an embodiment of the present invention.

In an exemplary implementation, the broadcast scenario can include a webinar user 402, an API server 404, a live stream API server 406, an external RTMP source server 408 and a RTMP server 410. A start broadcast 412 can include the webinar user 402 to dispatch a POST 402-1 to the API server 404. The API server 404 can dispatch POST/liveapi/channels 404-1 to the live stream API server 406. Further, the live stream API server 406 can be returned at step 404-2 from the live stream API server 406 to the API server 404. The API server 404 can dispatch the POST/liveapi/channels/{livestreamid}/publisher at step 404-3 to the livestream API server 406. The livestream API server 406 can return RTMP publisher URL and stream key at step 404-4 to the API server 404. The API server 404 can dispatch POST/config/api/v1/calls at step 404-5 to the external RTMP source server 408. Further, the external RTMP source server 408 can return RTMP video (call-id) 408-1 to the API server 404, and the API server 404 can return success response 402-2 to the webinar user 402. Correspondingly, the external RTMP source server 408 dispatches a live RTMP stream 408-2 to the RTMP server 410. Further, the RTMP server 410 can dispatch GET/liveapi/on_publish 410-1 to the live stream API server 406. The live stream API server 406 can return a success response 406-1 to the RTMP server 410, and the RTMP server 410 can initiate self call on stream end at step 410-3.

In another embodiment, a stop broadcast 414 can include the webinar user 402 to dispatch a POST/api/meeting/{meetingid}/webinar/stopbroadcasting 402-3 to the API server 404. Further, the API server 404 can dispatch DELETE/config/api/v1/calls/{call-id} 404-6 to the external RTMP source server 408. The external RTMP source server 408-2 can return success response to the API server 404. The API server 404 can return success response 404-7 to the webinar user 402.

Figure 5:
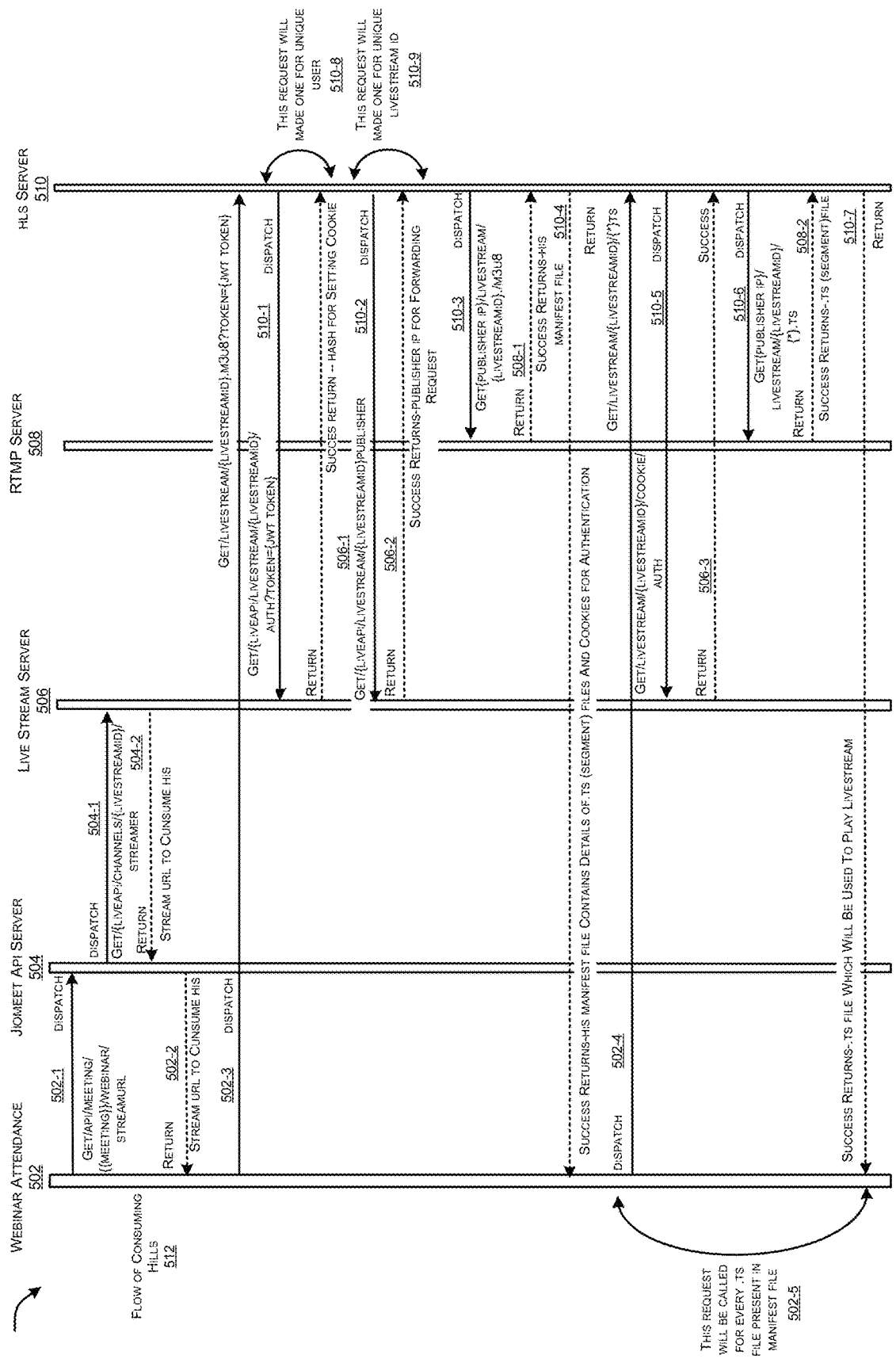
FIG. 5 illustrates an exemplary sequence diagram representing consumption of HLS of the proposed system, in accordance with an embodiment of the present invention.

FIG. 5 illustrates an exemplary sequence diagram representing consumption of HLS of the proposed system, in accordance with an embodiment of the present invention.

In an embodiment, the broadcast scenario can include a webinar user 502, an API server 504, a live stream API server 506, a RTMP server 508 and a HLS server 510. The steps for consuming HLS 512 can include the webinar user 502 to dispatch GET/api/meeting/{{meetingid}}/webinar/streamurl 502-1 to the API server 504, and the API server 504 to dispatch GET/liveapi/channels{livestreamid}/streamer 504-1 to the livestream API server 506. The live stream API server 506 can return stream URL to consume HLS 504-2 to the API server 504. The webinar user 502 can dispatch GET/livestream/{livestreamId}.m3u8?token={JWT token} 502-3 to the HLS server 510. The HLS server 510 can dispatch GET/liveapi/livestream/{livestreamId}/auth?token={JWT token} 510-1 to the live stream API server 506, and at step 510-8 a request can be made once for unique user. The live stream API server 506 can return success returns—hash for setting cookie 506-1 to the HLS server 510. The HLS server 510 can dispatch GET/liveapi/livestream/{livestreamId}/publisher 510-2 to the live stream API server 506, and at step 510-9 a request can be made once for unique livestream id. The live stream API server 506 can return, success returns—publisher ip for forwarding request 506-2 to the HLS server 510. The HLS server 510 can dispatch GET {publisher ip}/livestream/{livestreamId}.m3u8 510-3 to the RTMP server 508-1. The RTMP server 508 can return success returns—HLS manifest file 508-1 to the HLS server 510. The HLS server 510 can dispatch success returns—manifest file contains details of .ts (segment) files and cookie for authentication 510-4 to the webinar user 502. The webinar user 502 can dispatch GET/livestream/{livestreamId}/{*}.ts 502-4 to the HLS server 510. The HLS server 510 can dispatch GET/livestream/{livestreamId}//cookie/auth 510-5 to the live stream API server 506. The livestream API server 506 can return success 506-3 to the HLS server 510. The HLS server 510 can dispatch GET {publisher ip}/livestream/{livestreamId}/{*}.ts 510-6 to the RTMP server 508. The RTMP server 508 can return success return-.ts(segment) file 508-2 to the HLS server 510. The HLS server 510 can return success returns-.ts file, which can be used to play live stream 510-7 to the webinar user 502. The step 502-5 a request can be called for every .ts file present in the manifest file.

In an embodiment, the webinar user 502 can firstly make a call to the API server 504 for live stream URL to consume HLS. The API server 504 can make a call to the livestream API server 506 with live stream details like livestreamId, and the API server 506 can correspondingly return the stream URL. Then, the webinar user 502 can start requesting the livestream content from stream URL received. The requests goes to the HLS server 510 where the request can make a call to verify user authentication to the livestream API server 506. The requested content is searched in cache of HLS server 510. If the requests entry exists in cache then same is returned to user. If entry doesn't exist, then HLS server 510 can make call to livestream API server 506 to find which RTMP server 508 can publish that specific livestream as there can be multiple RTMP servers. Then, the HLS server 510 can fetch content from that particular RTMP server 508, and populate its cache with new entry and returns content to the user. The encrypted HLS format can contain three different files comprising a manifest file (.m3u8), a key file (.key), and a video segment file (.ts).

FIGS. 6A and 6B illustrates an exemplary representation of a master manifest file and a child manifest file, respectively, in accordance with an embodiment of the present invention.

In an embodiment, a manifest file can include at least two sub-types, which are a master manifest file, and a child manifest file. FIG. 6A illustrates the master manifest file, which can include information related to the types of resolution over which a particular live stream content is being served. The master manifest file includes different resolutions namely 720p, 480p, 360p, 240p, and the likes, which can be served for live streaming. FIG. 6B illustrates the child manifest file, which can include information related to video segment files, key files, and a sequence to be used for playing live stream and decrypting video segments, respectively. The key file of the encrypted HLS format can include key to decrypt the video segment files, which are encrypted using AES 128 algorithm. The video segment file can include an actual live stream video content in encrypted form, which can be decrypted and played by the user's player using respective key files mentioned in the child manifest file. In FIG. 6B, 1608316933992.ts can be decrypted using 1608316929695.key file. Similarly, 1608316938341.ts, 1608316942322.ts can be decrypted using 1608316938341.key file.

Figure 7:
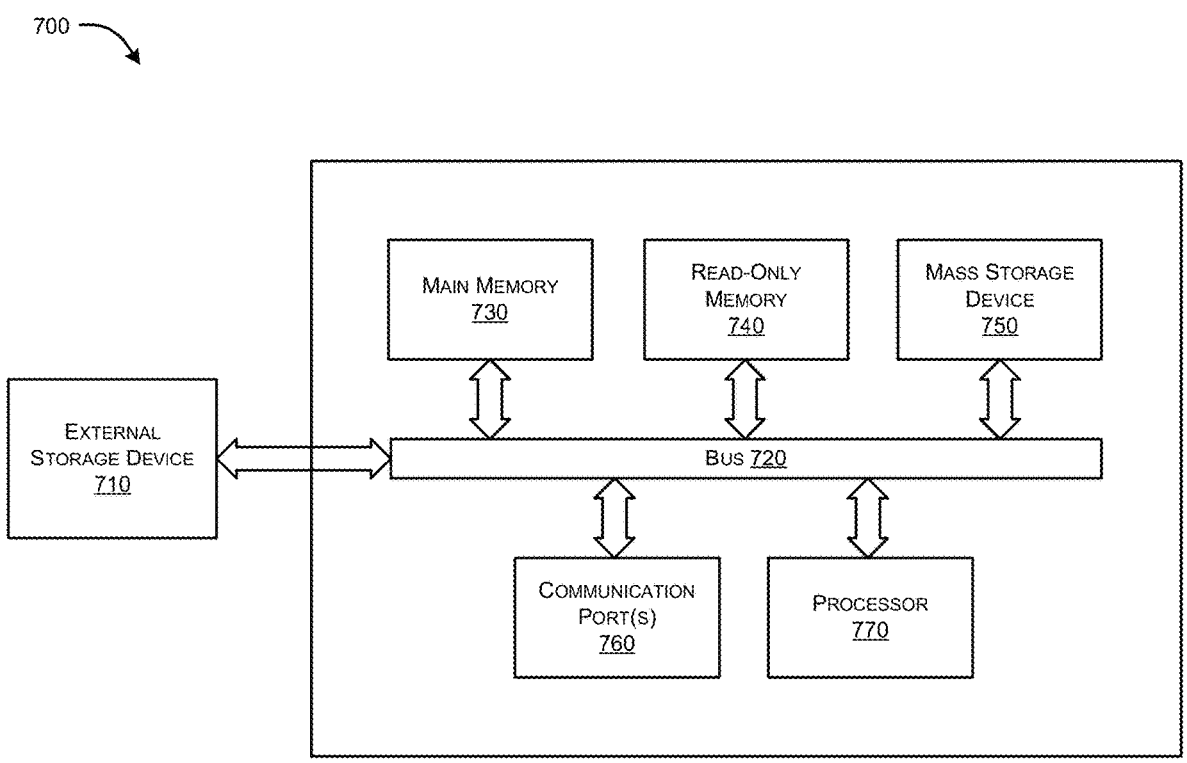
FIG. 7 illustrates an exemplary computer system in which or with which embodiments of the present invention can be utilized in accordance with embodiments of the present disclosure.

FIG. 7 illustrates an exemplary computer system in which or with which embodiments of the present invention can be utilized in accordance with embodiments of the present disclosure. As shown in FIG. 7, computer system 700 can include an external storage device 710, a bus 720, a main memory 730, a read only memory 740, a mass storage device 750, communication port 760, and a processor 770. A person skilled in the art will appreciate that the computer system may include more than one processor and communication ports. Examples of processor 770 include, but are not limited to, an Intel® Itanium® or Itanium 2 processor(s), or AMD® Opteron® or Athlon MP® processor(s), Motorola® lines of processors, FortiSOC™ system on chip processors or other future processors. Processor 770 may include various modules associated with embodiments of the present invention. Communication port 760 can be any of an RS-232 port for use with a modem based dialup connection, a 10/100 Ethernet port, a Gigabit or 10 Gigabit port using copper or fiber, a serial port, a parallel port, or other existing or future ports. Communication port 760 may be chosen depending on a network, such a Local Area Network (LAN), Wide Area Network (WAN), or any network to which computer system connects. Memory 730 can be Random Access Memory (RAM), or any other dynamic storage device commonly known in the art. Read-only memory 740 can be any static storage device(s) e.g., but not limited to, a Programmable Read Only Memory (PROM) chips for storing static information e.g., start-up or BIOS instructions for processor 770. Mass storage 750 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 872 family) or Hitachi (e.g., the Hitachi Deskstar 8K700), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 720 communicatively couples processor(s) 770 with the other memory, storage and communication blocks. Bus 720 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 770 to software system.

Optionally, operator and administrative interfaces, e.g. a display, keyboard, and a cursor control device, may also be coupled to bus 720 to support direct operator interaction with a computer system. Other operator and administrative interfaces can be provided through network connections connected through communication port 760. The external storage device 710 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Thus, the present disclosure provides a unique and end to end solution to convert RTMP stream into HLS format and make the solution scalable for production.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

Advantages of the Present Disclosure

The present disclosure provides for a system and method for caching RTMP at an edge server level.

The present disclosure provides for a system and method to prevent blocking by firewalls.

The present disclosure provides for a system and method to convert RTMP stream to HLS format and server it to end user over http, whose response can be cached at edge server level.

The present disclosure provides for a streamer component which passes a fraction of traffic requests to Publisher and remaining traffic requests are served from cache.

The present disclosure provides for the streamer component can be added as and when required depending upon the traffic.

The present disclosure provides for a system that enables scaling of the product.

We claim:

1. A system for converting Real-Time Messaging Protocol (RTMP) into HTTP Live streaming (HLS), the system comprising:
    one or more processors coupled with a memory, wherein said memory stores instructions which when executed by the one or more processors causes said system to:
    receive, at a publisher module, a set of data packets, wherein the set of data packets pertain to RTMP data stream received from one or more computing devices, and wherein the publisher module is operatively coupled to the processor,
    receive, at the publisher module, a first key along with the set of data packets, wherein the first key is associated with a second key of a server; extract, by the publisher module, the first key from the set of data packets received;
    authenticate, by the publisher module, the set of data packets, wherein the first key extracted from the set of data packets is validated against the second key associated with the server; and
    extract, by the publisher module, one or more metadata from the authenticated set of data packets based on a set of predefined resolutions; and transcode, by the publisher module, the one or more metadata extracted into one or more HLS formatted data packets based on a predefined set of instructions,
    wherein the publisher module is not communicatively coupled to an end user computing device, and wherein the end user computing device accesses the one or more encrypted HLS formatted data packets stored in the one or more storage devices through a streamer module operatively coupled to the publisher module.

2. The system as claimed in claim 1, wherein the publisher module encrypts the one or more HLS formatted data packets with a third key based on the set of predefined set of instructions, wherein the third key is linked to the first key and the second key.

3. The system as claimed in claim 1, wherein the publisher module stores the encrypted one or more HLS formatted data packets in one or more storage devices coupled to the publisher module.

4. The system as claimed in claim 1, wherein the publisher module rejects a set of data packets if a first key is not validated against a second key associated with the server.

5. The system as claimed in claim 1, wherein the one or more processors causes said system to:
    receive, by the streamer module, a set of requests pertaining to accessing of the one or more HLS formatted data packets stored in the one or more storage devices;

receive, by the streamer module, an authentication key along with the set of requests;

extract, by the streamer module, the authentication key from the set of requests received;

authenticate, by the streamer module, the set requests received, wherein the authentication key extracted from the set of requests is validated against the second key associated with the server;

check, by the streamer module, if the second key corresponds to the third key associated with the one or more HLS formatted data packets; and enable, by the streamer module, access to the end user computing device for streaming the one or more HLS formatted data packets stored in the one or more storage devices.

6. The system as claimed in claim 5, wherein the streamer module rejects a set of requests if an authentication key is not validated against a second key associated with the server.

7. The system as claimed in claim 5, wherein the streamer module is configured to:
fetch the set of HLS formatted data packets from the publisher module; cache the set of HLS formatted data packets in the one or more storage devices; send the set of HLS formatted data packets from the one or more storage devices to the end user computing device as a response to the request of the end user computing device;
send the set of HLS formatted data packets to a new end user, when the new user requests for the same set of HLS formatted data packets, wherein the streamer module responds directly from the one or more storage devices without fetching the set of HLS formatted data packets from the publisher module.

8. The system as claimed in claim 5, wherein the streamer module is added as and when required depending upon one or more traffic requests received at the publisher module.

9. A method for converting Real-Time Messaging Protocol (RTMP) into HTTP Live streaming (HLS), the method comprising:
receiving, at a publisher module coupled to one or more processors, a set of data packets, wherein the set of data packets pertain to RTMP data stream received from one or more computing devices;
receiving, at the publisher module, a first key along with the set of data packets, wherein the first key is associated with a second key of a server;
extracting, by the publisher module, the first key from the set of data packets received;
authenticating, by the publisher module, the set of data packets, wherein the first key extracted from the set of data packets is validated against the second key associated with the server;
extracting, by the publisher module, one or more metadata from the authenticated set of data packets based on a set of predefined resolutions; and
transcoding, by the publisher module, the one or more metadata extracted into one or more HLS formatted data packets based on a predefined set of instructions, wherein the publisher module, is not communicatively coupled to an end user computing device, and wherein the method further comprises:
enabling, through a streamer module operatively coupled to the publisher module, access of the end user computing device to the one or more encrypted HLS formatted data packets stored in the one or more storage.

10. The method as claimed in claim 9, wherein the method further comprises: encrypting, by the publisher module, the one or more HLS formatted data packets with a third key based on the set of predefined set of instructions, wherein the third key is linked to the first key and the second key.

11. The method as claimed in claim 9, wherein the method further comprises: storing, by the publisher module, the encrypted one or more HLS formatted data packets in one or more storage devices coupled to the publisher module.

12. The method as claimed in claim 9, wherein the method further comprises: rejecting, by the publisher module, a set of data packets if a first key is not validated against a second key associated with the server.

13. The method as claimed in claim 9, wherein the method further comprises: receiving, by the streamer module, a set of requests pertaining to accessing of the one or more HLS formatted data packets stored in the one or more storage devices;
receiving, by the streamer module, an authentication key along with the set of requests;
extracting, by the streamer module, the authentication key from the set of requests received;
authenticating, by the streamer module, the set requests received, wherein the authentication key extracted from the set of requests is validated against the second key associated with the server;
checking, by the streamer module, if the second key corresponds to the third key associated with the one or more HLS formatted data packets; and enabling, by the streamer module, access to the end user computing device for streaming the one or more HLS formatted data packets stored in the one or more storage devices.

14. The method as claimed in claim 13, wherein the method further comprises: rejecting, by the streamer module a set of requests if an authentication key is not validated against a second key associated with the server.

15. The method as claimed in claim 13, wherein the method further comprises: fetching the set of HLS formatted data packets from the publisher module;
caching the set of HLS formatted data packets in the one or more storage devices;
sending the set of HLS formatted data packets from the one or more storage devices to the end user computing device as a response to the request of the end user computing device;
sending the set of HLS formatted data packets to a new end user, when the new user requests for the same set of HLS formatted data packets, wherein the streamer module responds directly from the one or more storage devices without fetching set the set of HLS formatted data packets from the publisher module.

16. The method as claimed in claim 13, wherein the streamer module is added as and when required depending upon the traffic requests received at the publisher module.

* * * * *